United States Patent

Hunck et al.

[11] 3,894,606

[45] July 15, 1975

[54] CONTROL SYSTEM FOR HYDROSTATIC DRIVE TRACTORS

[75] Inventors: Billie Gene Hunck; Gordon K. Wiegardt, both of Cedar Falls, Iowa

[73] Assignee: Deere & Company, Moline, Ill.

[22] Filed: Oct. 23, 1974

[21] Appl. No.: 517,220

[52] U.S. Cl................ 180/66 R; 60/484; 180/44 M
[51] Int. Cl.²......................................... B60K 17/34
[58] Field of Search............. 180/66 R, 66 F, 44 M; 60/484, 329

[56] References Cited
UNITED STATES PATENTS

| | | | |
|---|---|---|---|
| 3,480,099 | 11/1969 | Nighswonger et al............. | 180/44 M |
| 3,552,516 | 1/1971 | Beard et al......................... | 180/66 R |
| 3,702,642 | 11/1972 | Greene............................... | 180/44 M |

*Primary Examiner*—David Schonberg
*Assistant Examiner*—David M. Mitchell

[57] ABSTRACT

A control system is described for variable torque auxiliary hydrostatic drives for engine driven tractors having variable ratio mechanical transmissions. The system includes manually activated torque switch means for selection of either high or low torque hydrostatic drive operation and further includes transmission sensor means responsive to the selected ratio of the mechanical transmission and operatively associated with control means to automatically shift the hydrostatic drive from high to low torque operation when high torque operation has been selected and the mechanical transmission has been shifted to an intermediate ratio, and to automatically prevent all operation when the mechanical transmission is shifted to a high ratio. The control means is further responsive to pressure sensor means operatively associated with the hydraulic system and presettable to indicate a high hydraulic system pressure below which the control means shifts the hydrostatic drive from high to low torque operation and a low pressure below which the control means shifts the hydrostatic drive from low torque operation to off. The pressure sensors means also includes means for delaying the shifting from one mode of operation to another in order to prevent on-off and low-high torque cycling.

25 Claims, 3 Drawing Figures

CONTROL SYSTEM FOR HYDROSTATIC DRIVE TRACTORS

BACKGROUND OF THE INVENTION

The present invention relates generally to control systems for variable torque, hydrostatic front wheel drives for tractors and more specifically to automatic shifting of the torque level in response to transmission ratio and/or hydraulic system pressure.

Tractor hydrostatic drive control systems responsive to transmission gearshift controls, range select controls, and hydraulic fluid pressure level are well known as described in U.S. Pat. No. 3,481,419 to J. H. Kress et al and the U.S. Pat. No. 3,480,099 to L. L. Nighswonger et al. In these control systems, after manual activation for high or low torque operation, the hydrostatic drive will respond to changes in the transmission ratio to automatically switch from high torque operation of off when high torque has been selected and the transmission is shifted to an intermediate ratio, and to automatically prevent all operation when the mechanical transmission is shifted to a high ratio. Further, when the hydraulic pressure to the hydrostatic drive motors drops below a single predetermined level, all operation of the hydrostatic drives is automatically prevented.

SUMMARY OF THE INVENTION

It is the general object of the present invention to provide a control system for an auxiliary hydrostatic drive system for a vehicle having a main variable ratio mechanical transmission drive system, the control system being manually activated for either high or low torque operation and including transmission sensor means responsive to the ratio of the mechanical transmission to automatically switch from high torque operation to low torque operation when high torque has been selected and the mechanical transmission is shifted to an intermediate ratio, and to automatically prevent all operation when the mechanical transmission is shifted to a high ratio.

It is a further object of the present invention to provide a control system for an auxiliary hydrostatic drive system on a vehicle having a main variable ratio mechanical transmission drive system, the control system being manually activated for either high or low torque operation and including pressure means responsive to the hydraulic system pressure to effect automatic switching of the hydrostatic drive system from high to low torque operation when high torque has been selected and the hydraulic system pressure has dropped below a high predetermined pressure level, and to effect automatic prevention of all operation when the pressure has dropped below a low predetermined pressure level.

It is a further object of the present invention to provide a control system for an auxiliary hydrostatic drive system on a vehicle having a main variable ratio mechanical transmission drive system, the control system being manually activated for either high or low torque operation and including (1) transmission sensor means responsive to the ratio to the mechanical transmission to effect automatic switching of the hydrostatic drive system from high to low torque operation when high torque has been selected and the mechanical transmission s shifted to an intermediate ratio, and to effect automatic prevention of all operation when the mechanical transmission is shifted to a high ratio, and (2) pressre sensor means responsive to the hydraulic system pressure to effect automatic switching of the hydrostatic drive system from high to low torque operation when high torque has been selected and the pressure has dropped below a high predetermined pressure level, and to effect automatic prevention of all operation when the pressure has dropped below a predetermined low pressure level.

The above and additional objects and advantages of the invention will become apparent to those skilled in the art from a reading of the following detailed description when taken in conjunction with the accompanying drawings.

BRIEF DESCRIPTION OF THE DRAWINGS

FIG. 3 is a schematic illustration of the hydrostatic drive system including the control system showing an alternate embodiment of the present invention.

DESCRIPTION OF THE PREFERRED EMBODIMENT

Figures 1, 2:
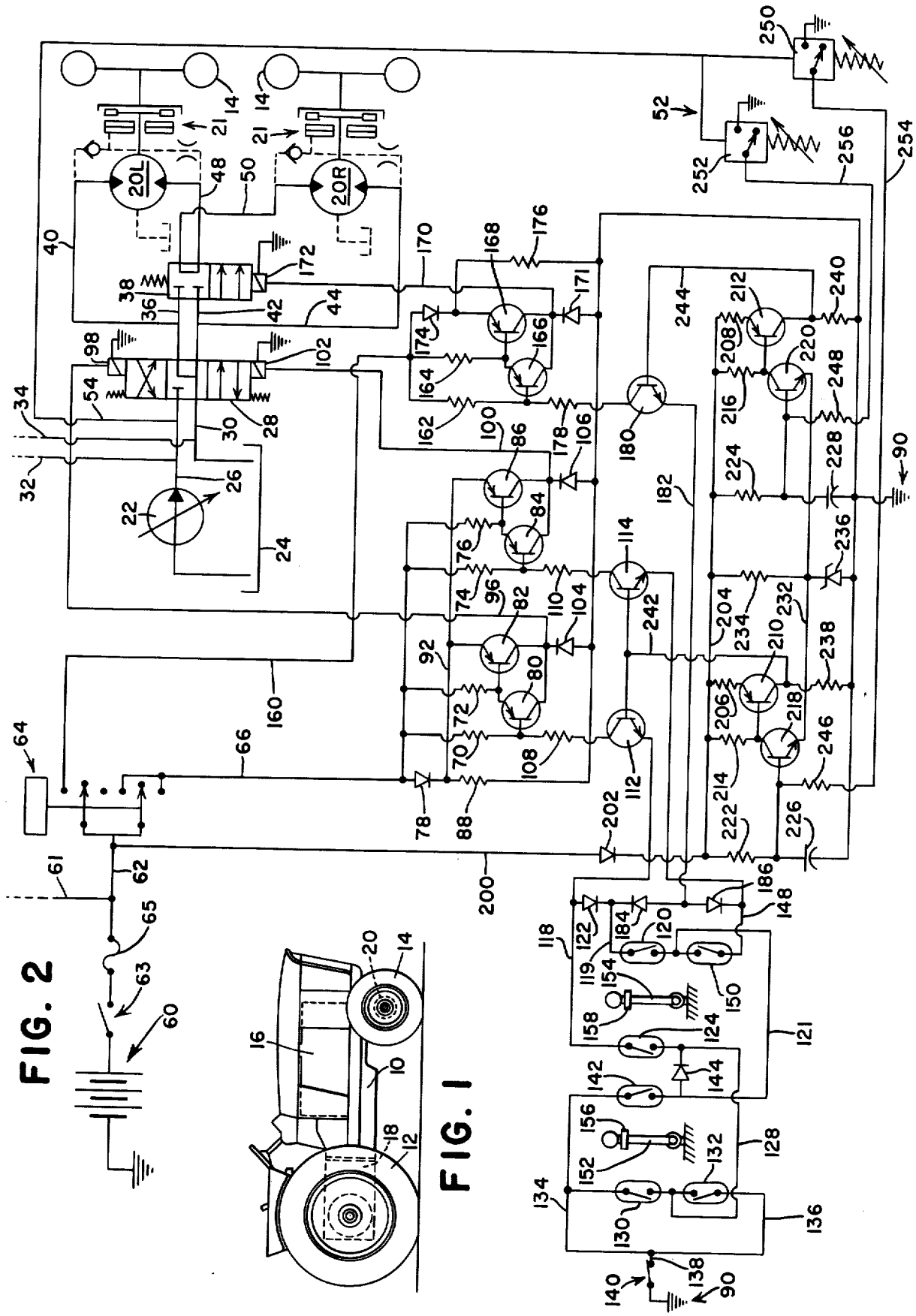
FIG. 1 is a side view of an agricultural tractor schematically illustrating the general location of most of the principal drive components, including the hydrostatic drive.
FIG. 2 is a schematic illustration of a hydrostatic drive system including the control system in which the present invention is embodied.

Referring to the drawings, a typical agricultural tractor is illustrated in FIG. 1 and includes a chassis 10 mounted on a pair of rear main traction wheels 12 and a pair of forward steerable wheels 14. The tractor includes an engine 16 connected to the rear traction wheels 12 through a conventional variable ratio mechanical transmission 18. The tractor also includes a pair of reversible hydraulic motors 20, each of which has one part fixed to the tractor chassis 10 and a rotatable part drivingly connected to one of the steerable wheels 14.

The hydrostatic drive system, as shown in FIG. 2, includes a main variable displacement, pressure compensated hydraulic pump 22, and a reservoir 24 providing a supply of fluid for the pump 22. The output of the pump 22 is connected by a fluid line 26 to one port in a first side of a spring-centered, pilot-operated, three-position, four-way, direction control valve 28. A second port on the first side of the direction valve 28 is connected to the reservoir 24 by a reservoir line 30. Fluid lines 32 and 34 are connected to fluid lines 26 and 30, respectively, to serve as supply and exhaust lines for primary hydraulic functions such as hydraulic steering, hydraulic brakes and rockshaft load lifting cylinder (not shown).

A first port in the second side of the direction valve 28 is connected by a fluid line 36 to a first port in the first side of a low torque-series motors-high speed, high torque-parallel motors-low speed, torque control valve 38. Fluid line 36 is also connected by a fluid line 40 to a first port in a wheel drive motor 20L. A fluid line 42 extends between a second port in the second side of the direction valve 28 and a second port in the first side of the torque valve 38. Fluid line 42 is also connected to a second port in a wheel motor 20R by a fluid line 44.

A first port in the second side of the torque valve 38 is connected to a first port in the wheel motor 20R by a fluid line 50 and a second port in the second side of the torque valve 38 is connected to a second port in the motor 20L by a fluid line 48. When the torque valve 38, which is low torque connection biased, is shifted for the high torque connection, it connects wheel motors 20L and 20R in parallel relationship to each other for high torque-low speed operation and when the torque valve 38 is shifted for the alternate low torque connection, it connects the motors 20L and 20R in series relationship with each other for low torque-high speed operation.

The motors 20 are drivingly connected to the wheels 14 by conventional torque transmitting components, generally illustrated at 21. The specific structure of the toque transmitting components do not constitute a part of this invention and for a specific description thereof reference should be made to U.S. Pat. No. 3,481,419 to J. H. Kress et al. The torque transmitting components effect engagement of the motors 20 with the wheels 14 when pressurized fluid is supplied to the torque transmitting components 21 and effect disengagement when the pressurized fluid is relieved to the reservoir 24 as is fully described in the aforementioned U.S. Pat. No. 3,481,419.

To the fluid line 26 between the fluid line 32 and the direction valve 28 is connected a fluid line 54 which is further connected to pressure sensor means, generally indicated at 52, which will hereinafter be described.

The control system for the direction valve 28 and the torque valve 38 is powered by any suitable source of electrical energy such as a tractor battery 60. The source is connected to an ignition switch 63 and a fuse 65. The fuse 65 is connected by a lead 61 to primary electrical functions (not shown) and by a lead 62 to a manually controlled, double-pole, double-throw, center-off, torque control switch 64 which selectively disconnects all leads in the off position, interconnects the main lead 62 with a source lead 66 in the low torque mode, or interconnects the main lead 62 with the source lead 66 and a high torque lead 160 in the high torque mode.

Connected to the source lead 66 are resistors 70, 72, 74, and 76, which are connected to the bases of PNP transistors 80, 82, 84, and 86, respectively. The bases of transistors 82 and 86 are also connected to the emitters of transistors 80 and 84, respectively. The source lead 66 is also connected through a diode 78 and a power lead 92 to the emitters of the transistors 82 and 86. The diode 78 is also connected to a ground 90 through a resistor 88. A forward solenoid lead 96 connects the collectors of transistors 80 and 82 to a forward direction solenoid 98 which when activated shifts the direction valve 28 for forward operation of the motors 20. A reverse solenoid lead 100 connects the collectors of transistors 84 and 86 to a reverse direction solenoid 102 which when activated shifts the direction valve 28 for reverse rotation of the motors 20. Connecting the solenoid leads 96 and 100 to ground are a pair of diodes 104 and 106, respectively.

The bases of transistors 80 and 84 are connected to resistors 108 and 110, respectively, which connect with the collectors of a pair of NPN transistors 112 and 114, respectively. The emitter of transistor 112 is connected to a first transmission switch lead 118 which further connects with a low range sensor or normally open reed switch 120 through a diode 122 and a lead 119. The low range switch 120 interconnects the lead 119 to a first switching lead 121.

The first transmission switch lead 118 is also connected to a high range sensor or normally-open reed switch 124 which connects the first transmission switch lead 118 to a second switching lead 128. Connected in parallel to the second switching lead 128 are first and second gearshift sensors or normally open reed switches 130 and 132, respectively, which are also connected to first and second gearshift leads 134 and 136, respectively, which in turn are connected to a clutch lead 138 which is further connected to ground through a normally closed clutch switch 140. A third gearshift sensor or normally open reed switch 142 interconnects the first switching lead 121 with the first gearshift lead 134. A diode 144 connects the first and second switching leads 121 and 128. The emitter of transistor 114 is connected by a second transmission switch lead 148 to a reverse range sensor or normally open reed switch 150 which is also connected to the first switching lead 121.

The normally open gearshift switches 130, 132 and 142 are closed by the proximity of a magnet 156 carried on a gearshift lever 152 and the normally open range select switches 120, 124, and 150 are closed by the proximity of a magnet 158 carried on a range select lever 154. The levers 152 and 154 are used to establish the ratio of the transmission 18 which may be a six ratio transmission with forward and reverse where the low range and the three gearshift positions indicate the lower three ratios of the transmission, the high range and the three gearshift positions indicate the intermediate two gear ratios and the highest gear ratio, and the reverse range and the three gearshift positions indicate the reverse three transmission ratios. However, the sensors could be associated with components of the transmission other than the levers 152 and 154 as long as they will be responsive to the ratio of the transmission. As is evident to those skilled in the art, a different transmission arrangement would require a correspondingly different sensor arrangement.

Returning to the torque switch 64, in the high torque mode, the main lead 62 remains interconnected to the source lead 66 and is further interconnected to the high torque lead 160, to which the bases of a pair of PNP transistors 166 and 168 are connected by resistors 162 and 164, respectively. The base of transistor 168 is also connected to the emitter of transistor 166. The emitter of transistor 168 is connected by a diode 174 to the high torque lead 160. The diode 174 is further connected to ground through a resistor 176. A torque solenoid lead 170 connects the collectors of transistors 166 and 168 to a high torque solenoid 172 which when activated shifts the torque valve 38 to connect the motors 20 in parallel for high torque operation. Connecting the torque solenoid lead 170 to ground is a diode 171. The collector of a NPN transistor 180 is connected by a resistor 178 to the base of transistor 166. The emitter of transistor 180 is connected to a third transmission switch lead 182 which is connected to the lead 119 by a diode 184 and to the second transmission switch lead 148 by a diode 186.

For the hydraulic pressure related operations, the circuit includes the source and the main lead 62 to which is attached a first pressure switch lead 200 which is connected by a diode 202 to a second pressure switch lead 204. The emitters of a pair of PNP transistors 210 and 212 are connected by resistors 206 and 208 in parallel to the second pressure switch lead 204. The collectors of a pair of NPN transistors 218 and 220 are connected by a pair of resistors 214 and 216 in parallel to the second pressure switch lead 204. The bases of transistors 210 and 212 are connected to the collectors of transistors 218 and 220, respectively, and the bases of transistors 218 and 220 are connected to the second pressure switch lead 204 by resistors 222 and 224, respectively, and to the ground 90 by the capacitors 226 and 228, respectively. The emitters of transistors 218 and 220 are interconnected by a common lead 232 which is connected to the junction of a resistor 234 and a zener diode 236. The resistor 234 is connected to the second pressure switch lead 204 and the zener diode 236 is connected to the ground 90. The collectors of transistors 210 and 212 are connected to the ground 90 by a pair of resistors 238 and 240, respectively. The collector of transistor 210 is further connected by a first signal lead 242 to the bases of transistors 112 and 114, and the collector of transistor 212 is further connected by a second signal lead 244 to the base of transistor 180.

The bases of transistor 218 and 220 are connected by resistors 246 and 248, respectively, to sensor leads 254 and 256, respectively, which connect with a low pressure switch 250 and a high pressure switch 252, respectively, of the pressure sensor means 52 which are normally open when the hydraulic system is pressurized.

The control system can be divided into six circuits as follows: a forward direction control circuit generally including the forward solenoid 98, the transistors 80 and 82, and the diode 104; a reverse direction control circuit generally including the reverse solenoid 102, the transistors 84 and 86, and the diode 106; a torque control circuit generally including the high torque solenoid 172, transistors 166 and 168, and the diode 171; a low pressure signal circuit generally including the pressure switch 250, the resistors 222 and 234, the capacitor 226, the zener diode 236, and the transistors 112, 114, 210, and 218; a high pressure signal circuit generally including the pressure switch 252, the resistors 224 and 234, the capacitor 228, the zener diode 236, and the transistors 180, 212, and 220; and a transmission sensor circuit generally including the diodes 122, 144, 184, and 186, and the switches 120, 124, 130, 132, 142, and 150.

In the description of the operation, the effect of the resistors will be ignored, but those skilled in the art will recognize that the resistors are necessary to limit the current and provide the proper bias on the various transistors and diodes. Also, except where noted in the description of the operation of the pressure sensor means 52, it will be assumed that the demands of the hydrostatic drive plus the demands of the primary hydraulic functions are less than the capacity of the variable displacement pump 22 so that the pump maintains a predetermined high pressure level in the fluid line 26.

With the hydrostatic drive off and the torque switch 64 being in its center-off position, the direction valve 28 is in its center-biased position blocking the fluid line 26 and connecting the reservoir line 20 to both the fluid lines 36 and 42. Thus, there is no pressurized fluid to torque transmitting component 21 and the motors 20 are disengaged from wheels 14.

The operator activates the hydrostatic drive by switching the torque switch 64 from off to either low or high torque mode.

In the low torque mode, the source is interconnected by the torque switch 64 to the source lead 66 which effects a voltage bias at the bases of transistors 80, 82, 84 and 86, causing the transistors to be nonconductive. Due to othe connection of the diode 78 with the ground 90 through the resistor 88, current flows from the source lead 66 to forward bias the diode 78.

For the lower three transmission ratios, a closed-circuit between the first transmission switch lead 118 and the ground 90 is formed by the closing of the low range switch 120 and either the first, the second, or the third gearshift switch 130, 132, or 142. Since the transistor 112 would be in the conductive state as long as the predetermined pressure level is maintained as will be hereinafter explained, there will be a closed-circuit between the base of the transistor 80 and the ground 90. The transistor 80 of the forward direction control circuit is biased on through the resistor 108, the transistor 112, and the connection to the ground 90 and activates the transistor 82 into the conductive state. Activation of the transistor 82 permits current flow from the power lead 92 through the transistor 82 to foward solenoid lead 96 to energize the forward solenoid 98. Thus, the direction valve 28 will be shifted to interconnect the pump 22 to the fluid lines 42 and 44 for forward rotation of the motors 20.

For the intermediate two transmission ratios, a closed-circuit between the first transmission switch lead 118 and the ground 90 is formed by the closing of the high range switch 124 and either the first or the second gearshift switch 130 or 132. As aforein described, the closed-circuiting of the first transmission switch lead 118 activates the forward direction control circuit for forward rotation of the motors 20.

For the highest transmission ratio, a closed-circuit is prevented between the first transmission switch lead 118 and the ground 90 because the closing of the high range switch 124 and the third gearshift switch 142 reverse biases and prevents current flow through the diode 144. Thus, the forward solenoid 98 is deenergized and the direction valve 28 is centered so as to disengage the motors 20 from the wheels 14. When the forward solenoid 98 is de-energized, the induced reverse voltage spike caused by coil inductance in the forward solenoid 98 will be suppressed by the diode 104 which prevents the transistors 80 and 82 from being damaged by the high induced reverse voltage.

For the reverse three transmission ratios, a closed-circuit between the second transmission switch lead 148 and the ground 90 is formed by the closing of the reverse range switch 150 and either the first, the second, or the third gearshift switch 130, 132, or 142. Since the transistor 114 will be conductive as long as the predetermined pressure level is maintained, there will be a closed-circuit between the base of the transistor 84 and the ground 90. The transistors 84 of the reverse direction control circuit is biased on through the resistor 110, the transistor 114, and the connection to the ground 90 and activates the transistor 86 into the conductive state. Activation of the transistor 86 permits current flow from the power lead 92 to the reverse solenoid lead 100 to energize the reverse solenoid 102. Thus, the direction valve 28 will be shifted to interconnect the pump 22 to the fluid lines 36 and 40 for reverse rotation of the motors 20.

When the range control lever 154 is shifted from the reverse position, the reverse solenoid 102 is de-energized and the induced voltage spike is suppressed by the diode 106.

In the high torque mode, the source through the torque switch 64 remains connected to the source lead 66 for the low torque mode functions as aforein described, but in addition is interconnected through the torque switch 64 to the high torque lead 160 which imposes a voltage at the bases of transistors 166 and 168, causing them to become nonconductive. Diode 174 is forward biased through resistor 176 to the ground 90.

For the forward and reverse lower three transmission ratios in the high torque mode, a closed-circuit is formed between the third transmission switch lead 182 and the ground 90, and since the transistor 180 will be in the conductive state as long as the predetermined pressure level is maintained, there will be a closed-circuit between the base of transistor 166 and the ground 90. The transistor 166 of the torque control circuit is biased on through resistor 178, transistor 180, and the connection to ground, and activates the transistor 168 into the conductive state. Activation of the transistor 168 permits current flow from the high torque lead 160 through the transistor 168 to the torque solenoid lead 170 to energize the high torque solenoid 172. Thus, the torque valve 38 will be shifted to interconnect the fluid line 36 with the line 50 and the fluid line 42 with the line 48 for parallel connection of the motors 20 in high torque operation.

For the intermediate two and the highest transmission ratios, an open-circuit between the third transmission switch lead 182 and the ground 90 exists due to the diode 122 which becomes reversed biased and prevents current flow upon the closing of the high range switch 124 and either the firsts, the second, or the third gearshift switch 130, 132, or 142. Although the transistor 180 will be in the conductive state as long as a predetermined pressure level is maintained, the open-circuiting of the third transmission switch lead 182 results in the voltage at the base of transistor 166 increasing and biasing it off. With the transistor 166 biased off, the high torque signal circuit will be inactive allowing the torque valve 38 to automatically return to its low torque position.

When the high torque solenoid 172 is de-energized, the induced reverse voltage spike will be clamped by the diode 171.

Thus, when the control system is manually activated for high torque mode, automatic switching of the hydrostatic drive from high to low torque operation occurs when the mechanical transmission is shifted from a low ratio to an intermediate ratio because the torque control circuit is deactivated while the forward and reverse direction control circuits of the low torque mode remains activated. And when the control system is manually activated for either high or low torque mode, automatic deactivation of the torque control and the forward and reverse direction control circuits occurs when the mechanical transmission is shifted to a high ratio. Further, downshifting the transmission from higher to lower ratios results in automatic reverse operation of the control system from that which occurs when shifting from lower to higher ratios.

The operation of the control system for the hydrostatic drive as described above assumes that the pump 22 maintains the predetermined high pressure level in the fluid line 26. At this predetermined pressure level, transistors 210, 212, 218, and 220 are maintained in conduction because pressure switches 250 and 252 of the pressure sensor means 52 are held open by the pressure.

With pressure sensor means 52 open-circuited, the transistor 218 is biased on and activates the transistor 210. This permits current flow from the source through the transistor 210 which imposes a voltage between the collector of transistor 210 and the resistor 238 sufficient to provide the activating voltage at the bases of transistors 112 and 114.

Similarly, with pressure sensor means 52 open-circuited, the transistor 220 is biased on and activates the transistor 212. This permits current flow from the source through the transistor 212 which imposes a voltage between the collector of transistor 212 and the resistor 240 sufficient to provide the activating voltage at the base of transistor 180.

The activating voltages at the bases of transistors 112, 114, and 180 are always present when the hydraulic system is above the high pressure level and are not dependent on the torque switch 64 in order to avoid turn on delays when activating the hydrostatic drive via the torque switch 64.

When the demands of the hydrostatic drive plus the demands of the primary hydraulic functions are greater than the capacity of the pump 22, for example when the rockshaft is lifting a large enough load to reduce the hydraulic system pressure so that the pump 22 can not maintain a predetermined high pressure level, approximately 1,740 psi, in fluid line 26, the reduction in pressure effects a closing of the high pressure switch 252 and discharges the voltage on the capacitor 228. As the voltage at the base of transistor 220 and the charge on the capacitor 228 decreases and the transistor 220 is made nonconductive, the voltage at the base of transistor 212 increases rendering the transistor 212 nonconductive and resulting in the voltage at the base of transistor 180 being decreased rendering the transistor 180 nonconductive. When transistor 180 is nonconductive, the high torque control circuit is deactivated, the high torque solenoid 172 is de-energized, and the torque valve 38 is shifted to connect the motors 20 in series for low torque operation wherein the pressure demands are reduced.

When the demands of the hydrostatic drive plus the demands of the primary hydraulic functions are far greater than the capacity of the pump 22 so that the pump 22 can not maintain a predetermined low pressure level, approximately 1,232 psi, the low pressure switch 250 closes and discharges the capacitor 226. As the voltage at the base of transistor 218 and the charge on capacitor 226 decreases and the transistor 218 is made nonconductive, the voltage at the base of transistor 210 increases rendering the transistor 210 nonconductive and resulting in the voltage at the bases of transistors 112 and 114 being decreased and rendering the transistors 112 and 114 nonconductive. When transistors 112 and 114 are nonconductive, the forward and reverse direction control circuits, respectively, are deactivated, the forward and reverse solenoids 98 and 102 are de-energized, and the direction valve 28 is shifted to the off position thereby disconnecting the motors 20 from the wheels 14.

As the demands on the pump 22 decrease and the pressure level in the fluid line 26 increases to the predetermined low pressure level, the low pressure switch 250 opens to activate the low pressure signal circuit. The circuit then performs in exactly the reverse manner that it performs when the predetermined low pressure can not be maintained with the exception that the transistor 218 will not become conductive until the low pressure switch 250 has been open a time duration, approximately two seconds, sufficient for the current through the resistor 222 to charge the capacitor 226 to a voltage level above that established by the resistor 234 and the zener diode 236 which is necessary to activate the transistor 218. The time delay caused by these RC components may be varied in a manner as would be evident to those skilled in the art and is predetermined so as to eliminate off-on or off-low torque cycling due to short interval pressure surges.

As the demands on the pump 22 decrease and the pressure level in fluid line 26 increases to the predetermined high pressure level, the high pressure switch 252 opens to activate the high pressure signal circuit. The circuit then performs in exactly the reverse manner that it performs when the high pressure level can not be maintained with the exception that the transistor 220 will not become conductive until the high pressure switch 252 has been open a time duration, approximately 2 seconds, sufficient for the current through the resistor 224 to charge the capacitor 228 to the voltage level necessary to activate the transistor 220. The length of time delay again being determined by the value of the RC components.

In addition to establishing the switching voltage level of the transistors 218 and 220, the RC components and the resistor 234 and the zener diode 236 also suppress voltage transients that may deactivate the circuit inadvertently.

Thus, the objects of the present invention have been achieved by the herein described control system. When the torque switch is manually activated for high torque, the transmission is engaged in lower ratios, and the hydraulic system pressure is above a predetermined high pressure level, the forward or reverse direction control circuit is activated connecting the hydraulic drive motors 20 to the pump 22 and the torque control circuit is activated connecting the hydraulic drive motors 20 for high torque operation. A transmission shift to intermediate ratios or a reduction in hydraulic system pressure below the predetermined high pressure level causes the transmission sensor or pressure sensor 52 to automatically deactivate the torque control circuit shifting the hydraulic drive motor connections to low torque operation. A further transmission shift to a high ratio or a further reduction in hydraulic system pressure below the predetermined low pressure level causes the transmission sensor or pressure sensor means 52 to automatically deactivate the forward or reverse direction control circuits shifting the hydrostatic drive to the off position. And downshifting the transmission from higher to lower ratios results in automatic reverse operation of the control system from that which occurs when shifting from lower to higher ratios while increases in pressure from below the predetermined low pressure level to above the predetermined high pressure level will result in automatic, time delayed, reverse operation of the control system from that which occurs when the pressure is reduced.

Figure 3:
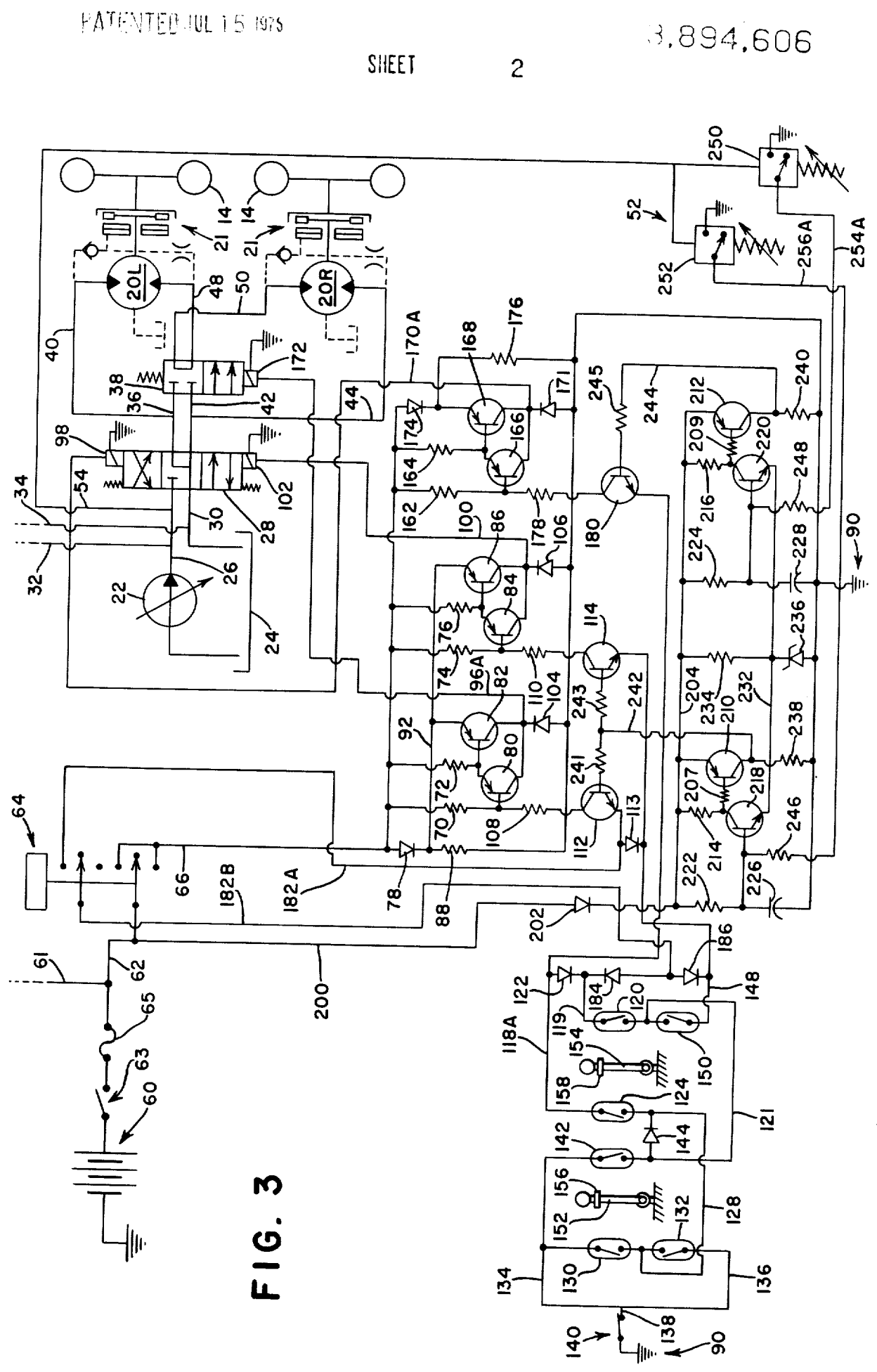

In an alternate embodiment, the control system circuit of FIG. 2 is slightly modified as shown in FIG. 3 wherein the same numbers as in prior figures refer to the same parts. The elimination of low torque mode in reverse in this embodiment improves the steering characteristics of the tractor in reverse operation.

The torque control switch 64 selectively disconnects all leads in the off position, interconnects the main lead 62 with the source lead 66 in the low torque, mode or interconnects the main lead 62 with the source lead 66 and interconnects transmission swtich leads 182A and 182B in the high torque mode. Connected to the source lead 66 are resistors 70, 72, 74, 76, 162, and 164, which are connected to the bases of PNP transistors 80, 82, 84, 86, 166, and 168, respectively. The collectors of transistors 80 and 82 are connected to the high torque solenoid 172 by a torque solenoid lead 96A, the collectors of transistors 84 and 86 are connected to the reverse direction solenoid 102 by the reverse solenoid lead 100, and the collectors of transistors 166 and 168 are connected to the forward direction solenoid 98 by a forward solenoid lead 170A.

The emitter of transistor 112 is connected to the transmission switch lead 182A which is interconnected to the transmission switch lead 182A by the torque control switch 64. In turn, the transmission switch lead 182B is connected between the diodes 184 and 186. A diode 113 is connected between the transmission switch lead 182A and the second transmission switch lead 148. Between the first signal lead 242 and the bases of transistors 112 and 114 are connected the resistors 241 and 243, respectively. The emitter of transistor 180 is connected to a first transmission switch lead 118A to which is connected the diode 122 and the high range switch 124 in parallel.

The emitters of transistors 210 and 212 are connected directly to the second pressure switch lead 204 in parallel and the bases of transistors 210 and 212 are connected by resistors 207 and 209 to the collectors of transistors 218 and 220, respectively. The base of transistor 218 is connected by resistor 246 and a lead 256A to the high pressure switch 252 and the base of transistor 220 is connected by the resistor 248 and a lead 254A to the low pressure switch 250.

The control system of the alternate embodiment can be divided into six circuits as follows: a forward direction control circuit generally including the forward solenoid 98, the transistors 166 and 168, and the diode 171; a reverse direction control circuit generally including the reverse solenoid 102, the transistors 84 and 86, torque control switch 64, and the diodes 106 and 113; a torque control circuit generally including the high torque solenoid 172, transistors 80 and 82, and the diode 104; a low pressure signal circuit generally including the pressure switch 250, the resistors 224, 234, the capacitor 228, the zener diode 236, and the transistors 180, 212, and 220; a high pressure signal circuit generally including the pressure switch 252, the resistors 222 and 234, the capacitor 226, the zener diode 236, and the transistors 112, 114, 210, and 218; and a transmission sensor circuit generally including the diodes 122, 144, 184, and 186, and the switches 120, 124, 130, 132, 142, and 150.

As before in the description of operation, the effect of the resistors will be ignored and also except where noted in the description of the operation of the pressure sensor means 52, it will be assumed that the demand of the hydrostatic drive plus the demands of the primary hydraulic functions are less than the capacity of the pump 22 so that the pump 22 maintains a predetermined pressure level in fluid line 26.

In the low torque mode, the source is interconnected by the torque switch 64 to the source lead 66 which imposes a voltage at the base of transistors 80, 82, 84, 86, 166, and 168, causing these transistors to be nonconductive.

For the lower three forward transmission ratios, a closed circuit is formed between the first transmission switch lead 118A and the ground 90, and since the transistor 180 would be in the conductive state as long as the predetermined pressure level is maintained, there will be a closed-circuit between the base of transistor 166 and the ground 90. The transistor 166 of the forward direction control circuit is biased on through the resistor 178, the transistor 180, and the connection to the ground 90 and activates the transistor 168 into the conductive state. Activation of the transistor 168 permits current flow from the emitter of transistor 168 through the transistor 168 to the forward solenoid lead 170A to energize the forward solenoid 98. Thus, the direction valve 28 will be shifted to interconnect the pump 22 to the fluid line 44 for forward rotation of the motors 20.

For the intermediate two forward ratios, a closed-circuit is formed between the first transmission switch lead 118A and the ground 90, and as aforein described, the closed-circuiting of the first transmission switch lead 118A activates the forward direction control circuit for forward rotation of the motors 20.

For the highest forward transmission ratio, a closed-circuit is prevented between the first transmission switch lead 118A and the ground 90 because of the closing of the high range switch 124 and the third gearshift switch 142 which reverse biases and prevents current flow through the diode 144. Thus, the forward solenoid 98 is de-energized and the direction valve 28 is centered so as to disengage the motors 20 from the wheels 14.

For the reverse three transmission ratios, a closed-circuit is formed between the second transmission switch lead 148 and the ground 90, and since the transistor 114 will be conductive as long as a predetermined pressure level is maintained as will be explained hereinafter, there will be a closed-circuit between the base of transistor 84 and the ground 90. The transistor 84 of the reverse direction control circuit is biased on through the resistor 110, the transistor 114, and the connection to the ground 90 and activates the transistor 86 into the conductive state. Activation of the transistor 86 permits current flow from the power lead 92 to the reverse solenoid lead 100 to energize the reverse solenoid 102. Thus, the direction valve 28 will be shifted to interconnect the pump 22 to the fluid line 40 for reverse rotation of the motors 20.

Simultaneously, a closed-circuit is formed between the second transmission switch 148 and the transmission switch lead 182A, and since the transistor 112 will be conductive as long as the predetermined pressure level is maintained, there will be a closed-circuit between the base of the transistor 80 and the ground 90. The transistor 80 of the torque control circuit is biased on through the resistor 108, the transistor 112, and the connection to the ground 90, and activates the transistor 82 into the conductive state. Activation of the transistor 82 permits current flow from the power lead 92 to energize the high torque solenoid 172. Thus, the torque valve 38 will be shifted to interconnect the fluid line 36 with the line 50 and the fluid line 42 with the line 48 for parallel connection of motors 20 and high torque hydrostatic drive operation with the torque switch 64 in the low torque mode.

In the high torque mode, the source through the torque switch 64 remains connected to the source lead 66 for low torque mode functions as aforein described and also interconnect transmission switch leads 182A and 182B.

For the forward and reverse lower three transmission ratios in the high torque mode, a closed-circuit is formed between the transmission switch lead 182B and the ground 90, and since the torque switch 64 interconnects the transmission switch leads 182B and 182A, and since the transistor 112 will be in the conductive state as long as the predetermined pressure level is maintained, there will be a closed-circuit between the base of transistor 80 and the ground 90. The transistor 80 of the torque control circuit is biased on through the resistor 108, the transistor 112, and the connection to the ground 90 activates the transistor 84 into the conductive state. Activation of the transistor 82 permits current flow from the power lead 92 through the transistor 82 to the torque solenoid lead 96A to energize the high torque solenoid 172. Thus, the torque valve 38 will be shifted to interconnect the fluid line 36 with the line 50 and the fluid line 42 with line 48 for parallel connection of motors 20 in high torque operation.

For the intermediate two and the highest forward transmission ratios, an open-circuit between the transmission switch lead 182B and the ground 90 exists due to the diode 122 which becomes reversed biased to prevent current flow. Although the transistor 112 will be in the conductive state as long as a predetermined pressure level is maintained, the open-circuiting of the transmission switch lead 182B results in the voltage at the base of transistor 80 increasing and biasing it off. With transistor 80 biased off, the high torque signal circuit will be inactive allowing the torque valve 38 to automatically return to its low torque position.

Thus, when the control system is manually activated for high torque mode, automatic switching of the hydrostatic drive from high to low torque operation occurs when the mechanical transmission is shifted to a forward intermediate ratio but does not occur when the mechanical transmission is shifted to a reverse ratio. This occurs because upon shifting the mechanical transmission the torque control circuit is deactivated while the forward direction control circuit remains activated and because the torque control circuit is activated while the reverse direction control circuit remains activated. The system also provides for reverse ratio operation only in high torque mode. And when the control system is manually activated for either high or low torque mode, automatic deactivation of the torque control and the forward and reverse direction control circuits occurs when the mechanical transmission is shifted to a high ratio. A downshifting of the transmission from higher to lower ratios results in the automatic reverse operation of the control system from that which occurs when shifting from lower to higher ratios.

The operation of the control system for the hydrostatic drive as described above assumes that the pump 22 maintains a predetermined pressure level in fluid line 26. At this predetermined pressure level, pressure switches 250 and 252 of prssure sensor means 52 are held open.

With pressure sensor means 52 open-circuited, the voltage at the base of transistor 218 activates the transistor 218 rendering it conductive such that the voltage reduction at the base of transistor 210 activates and permits current flow from the source through the transistor 210 which further imposes a voltage between the collector of transistor 210 and the resistor 238 sufficient to provide the actuating voltage at the bases of transistor 112 and 114.

Similarly, with the pressure sensor means 52 open-circuited, the voltage at the base of transistor 220 activates transistor 220 rendering it conductive such that the voltage reduction at the base of transistor 212 activates and permits current flow from the source through the transistor 212 which imposes a voltage between the collector of transistor 212 and the resistor 240 sufficient to provide the actuating voltage at the base of transistor 180.

The actuating voltages at the bases of transistor 112, 114, and 180 are always present when the hydraulic system is above the predetermined high pressure level and are not dependent on the torque switch 64 in order to avoid turn on delays when activating the hydrostatic drive via the torque switch 64.

When the demands of the hydrostatic drive plus the demands of the primary hydraulic functions are greater than the capacity of the pump 22, for example when the rockshaft is lifting a large enough load to reduce the hydraulic system pressure so that the pump 22 cannot maintain the predetermined high pressure level, approximately 1,740 psi, the reduction in pressure effects a closing of the high pressure switch 252 and discharges the voltage on the capacitor 228. As the voltage at the base of transistor 218 and the charge on capacitor 226 decrease and the transistor 218 is made nonconductive, the voltage at the base of transistor 210 increases rendering the transistor 210 nonconductive and resulting in the voltage at the bases of transistors 112 and 114 being decreased and rending the transistors 112 and 114 nonconductive. When transistors 112 and 114 are nonconductive, the torque control circuit and the reverse direction control circuit are deactivated, the high torque solenoid 172 and the reverse direction solenoid 102 de-energized, and the torque valve 38 is shifted to connect the motors 20 in series for low torque operation and the direction valve 28 is shifted to the off position thereby disconnecting the motors 20 from the wheels 14.

When the demands of the hydrostatic drive plus the demands of the primary hydraulic function are far greater than the capacity of the pump 22 so that the pump 22 cannot maintain a predetermined low pressure level, approximately 1,232 psi, the low pressure switch 250 closes and discharges the capacitor 226. As the voltage at the base of transistor 220 and the charge on the capacitor 228 decrease and the transistor 220 is made nonconductive, the voltage at the base of transistor 212 increases rendering the transistor 212 nonconductive and resulting in a voltage at the base of transistor 180 being decreased and rendering the transistor 180 nonconductive. When transistor 180 is nonconductive, the forward direction control circuit is deactivated, the forward solenoid 98 is de-energized, and the direction valve 28 is shifted to the off position thereby disconnecting motors 20 from the wheels 14.

As the demands on the pump 22 decrease and the pressure level increases to the predetermined low pressure level, the low pressure switch 250 opens to activate the low pressure signal circuit. The circuit then performs in exactly the reverse manner that it performs when the predetermined low pressure can not be maintained with the exception that the transistor 220 will not become conductive until the low pressure switch 250 has been open a time duration, approximately 2 seconds, sufficient for the current through the resistor 224 to charge capacitor 228 to a voltage level above that established by the resistor 234 and the zener diode 236 which is necessary to activate the transistor 220. The time delay caused by these RC components may be varied in a manner as would be evident to those skilled in the art and is predetermined so as to eliminate on-off cycling due to short interval pressure surges.

As the demands on the pump decrease and the pressure level increases to the predetermined high pressure level, the high pressure switch 252 opens to activate the high pressure signal circuit. The circuit then performs in exactly the reverse manner that it performs when the high pressure level can not be maintained with the exception that the transistor 218 will not become conductive until the high pressure switch 52 has been open a time duration, approximately 2 seconds, sufficient for the current through resistor 220 to charge the capcitor 226 to the voltage level necessary to activate transistor 218. The length of time delay again being determined by the value of the RC components.

Thus, the objects of the present invention have been achieved by the herein described control system. When the torque switch is manually activated for high torque, the transmission is engaged in lower ratios, and the hydraulic system pressures above a predetermined high pressure level, the forward or reverse direction control circuit is activated to connect the hydraulic drive motors to the pump 22 and the torque control circuit is activated to connect the hydraulic drive motors 20 for high torque operation. A transmission shift to a forward intermediate ratio or a reduction in the hydraulic pressure below the predetermined high pressure level causes the transmission sensors or the pressure sensor means 52 to automatically deactivate the torque control circuit shifting the hydraulic drive motor connections to low torque operation while a transmission shift to a reverse ratio causes the transmission sensor to automatically maintain activation of the torque control circuit leaving the hydraulic drive motor connection for high torque operation or causes the pressure sensor means 52 to automatically deactivate the torque control circuit and the reverse direction control circuit shifting the hydraulic drive motor connections to the off position. A further transmission shift to a high ratio or a further reduction in hydraulic system pressure below the predetermined low pressure level causes the transmission sensors or the pressure sensor means 52 to automatically deactivate the forward direction control circuit shifting the hydrostatic drive to the off position and downshifting the transmission from higher to lower ratios resulting in automatic reverse operation of the control system from that which occurs when shifting from lower to higher ratios while increases in pressure from below the predetermined low pressure level to above the predetermined high pressure level will result in automatic, time delayed, reverse operation of the control system from that which occurs when the pressure is reduced.

While the invention has been described in conjunction with these specific embodiments, it is to be understood that many alternatives, modifications, and variations will be apparent to those skilled in the art in light of the aforegoing description. Accordingly, it is intended to embrace all such alternatives, modifications, and variations that fall within the spirit and scope of the appended claims.

We claim:

1. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connections between off, high torque, and low torque; and transmission sensor means operatively associated with the transmission for sensing the forward high, intermediate, and low transmission ratios and the reverse transmission ratios, the improvement comprising: control means operatively associated with the transmission sensor means, the valve means, and the switch means to effect reversible automatic shifting of the valve means from high torque to low torque connections when high torque has been selected with the switch means, and the transmission sensor means senses an intermediate transmission ratio, and to effect reversible automatic shifting of the valve means to the off connection when the transmission sensor means senses a high transmission ratio.

2. The invention as claimed in claim 1 wherein the control means includes means to effect shifting of the valve means into the high torque connection when low torque has been selected with the switch means and the transmission sensor means senses a reverse transmission ratio.

3. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and the motors to supply pressurized fluid from the pump to the motors; torque valve means in the hydraulic system shiftable between a high torque position wherein it connects the motors with the pump in parallel relationship with each other and a low torque position wherein it connects the motors with the pump in series relationship with each other; direction valve means in the hydraulic system shiftable between an off position wherein it disconnects the motors from the pump, a forward position wherein it connects the motors with the pump for forward rotation of the motors, and a reverse position wherein it connects the motors with the pump for reverse rotation of the motors; torque switch means for selecting the torque valve means connections between high and low torque; transmission sensor means operatively associated with the transmission for sensing the forward high, intermediate, and low transmission ratios and the reverse transmission ratios; the improvement comprising: torque control means operatively associated with the transmission sensor means, the torque switch means, and the torque valve means to effect reversible automatic shifting of the torque valve means from high to low torque connections when high torque has been selected with the torque switch means and the transmission sensor means senses an intermediate transmission ratio; and forward and reverse direction control means operatively associated with the transmission sensor means and the direction valve means to effect reversible automatic shifting of the direction valve means to the off connection when the transmission sensor means senses a high transmission ratio.

4. The invention as claimed in claim 3 wherein the torque control means includes means to effect shifting of the torque valve means into the high torque connection when low torque has been selected with the switch means and the transmission sensor means senses a reverse transmission ratio.

5. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward conection wherein it connects the motors with the pump for forward rotation of the motors, and a reverse connection wherein it connects the motors with the pump for reverse rotation of the motors; switch means for selecting the valve means connections between off, high torque, and low torque; transmission sensor means operatively associated with the transmission for sensing the forward high, intermediate, and low transmission ratios and the reverse transmission ratios; pressure signal means operatively associated with the hydraulic system for sensing fluid pressure; the improvement comprising: control means operatively associated with the transmission sensor means, the pressure signal means, the valve means, and the switch means to effect reversible automatic shifting of the valve means from the high to the low torque connections when high torque has been selected with the switch means and either one or both of the transmission sensor means senses an intermediate transmission ratio or the pressure signal means senses a pressure of the pressurized fluid below a predetermined high pressure level, and to effect reversible automatic shifting of the valve means to the off connection when either high or low torque has been selected with the switch means and either one or both the transmission sensor means senses a high transmission ratio or the pressure signal means senses a pressure of the pressurized fluid below a predetermined low pressure level.

6. The invention defined in claim 5 wherein the pressure signal means includes time delay means delaying operation of the control means so that short interval reversible high-low-off torque cycling of the valve means is prevented.

7. A hydrostatic drive control system in a vehicle having an engine; a pair of main drive wheels, a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and motors to supply pressurized fluid from the pump to the motors; torque valve means in the hydraulic system shiftable between a high torque position wherein it connects the motors with the pump in parallel relationship with each other and a low torque position wherein it connects the motors with the pump in series relationship with each other; direction valve means in the hydraulic system shiftable between an off position wherein it disconnects the motors from the pump, a forward position wherein it connects the motors with the pump for forward rotation of the motors, and a reverse position wherein it connects the motors with the pump for reverse rotation of the motors; torque switch means for selecting the torque valve means connections between high and low torque; transmission sensor means operatively associated with the transmission for sensing the forward high, intermediate, and low transmission ratios and the reverse transmission ratios; pressure signal means operatively associated with the hydraulic system for sensing fluid pressure; the improvement comprising: torque control means operatively associated with the transmission sensor means, the torque switch means, the pressure signal means and the torque valve means to effect reversible automatic shifting of the torque valve means from the high and the low torque connections when high torque has been selected with the torque switch means and either one or both of the transmission sensor means senses an intermediate transmission ratio or the pressure means senses a pressure of the pressurized fluid below a predetermined high pressure level; and forward and reverse direction control means operatively associated with the transmission sensor means, the torque switch means, the pressure signal means, and the direction valve means to effect reversible automatic shifting of the direction valve means to the off connection when high or low torque has been selected with the torque switch means and either one or both of the transmission control sensor means senses a high transmission ratio or the pressure signal means senses a pressure of the pressurized fluid below a predetermined low pressure level.

8. The invention defined in claim 7 wherein the pressure signal means includes time delay means delaying operation of the torque control means and the forward and the reverse direction control means so that short interval high-to-off and forward-to-off and reverse-to-off cycling of the direction valve means are prevented.

9. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratio; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connections between off, high torque, and low torque; transmission sensor means operatively associated with the transmission for sensing the forward high, intermediate, and low transmission ratios and the reverse transmission ratios; pressure signal means operatively associated with the hydraulic system for sensing fluid pressure; the improvement comprising: control means operatively associated with the transmission sensor means, the pressure signal means, the valve means, and the switch means to effect reversible automatic shifting of the valve means from the the high to the low torque connections when high torque has been selected with the switch means and either the transmission sensor means senses a forward intermediate transmission ratio while the pressure signal means senses a pressure of the pressurized fluid above a predetermined high pressure level or the transmission sensor means senses a forward low or a reverse transmission ratio while the pressure signal means senses a pressure of the pressurized fluid below the predetermined high pressure level and to effect reversible automatic shifting of the valve means to the off connection when high or low torque has been selected with the switch means and either the transmission sensor means senses a forward high transmission ratio while the pressure signal means senses a pressure of the pressurized fluid above the predetermined low pressure level or the transmission sensor means senses a forward or reverse transmission ratio while the pressure signal means senses a pressure of the pressurized fluid below a predetermined low pressure level.

10. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connections between off, high torque, and low torque; pressure signal means operatively associated with the hydraulic system for sensing fluid pressure; and transmission sensor means operatively associated with the transmission for sensing the forward high, intermediate, and low transmission ratios and the reverse transmission ratios; the improvement comprising: control means operatively associated with the transmission sensor means, the pressure signal means, the valve means and the switch means to effect reversible automatic shifting of the valve means from the high to the low torque connections when high torque has been selected with the switch means and either the transmission sensor means senses a forward intermediate transmission ratio while the pressure signal means senses a pressure of the pressurized fluid above a predetermined high pressure level or the transmission sensor means senses a forward low transmission ratio while the pressure signal means senses a pressure of the pressurized fluid below the predetermined high pressure level and to effect reversible automatic shifting of the valve means to the off connection when high or low torque has been selected with the switch means and either the transmission sensor means senses a forward high transmission ratio while the pressure signal means senses a pressure of the pressurized fluid above a predetermined low pressure level or the transmission sensor means senses a forward transmission ratio while the pressure signal means senses a pressure of the pressurized fluid below the predetermined low pressure level or the transmission sensor means senses a reverse transmission ratio while the pressure signal means senses a pressure of the pressurized fluid below the predetermined high pressure level.

11. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by an engine to provide pressurized fluid; a pair of hydraulic wheel motors mounted at opposite ends of the axle structure and including output shafts operatively connected to the additional wheels; a hydraulic system interconnecting the pump and the motor to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connections between off, high torque, and low torque; and transmission sensor means operatively associated with the transmission for sensing the forward high, intermediate, and low transmission ratios and the reverse transmission ratios; the improvement comprising: control means operatively associated with the transmission sensor means, the valve means and the switch means to effect shifting of the valve means to the high or the low torque connections when high or low torque, respectively, has been selected with the switch means and the transmission sensor means senses a forward low or a reverse transmission ratio, to effect reversible automatic shifting of the valve means from the high to the low torque connections when high torque has been selected with the switch means and the transmission sensor means senses an intermediate transmission ratio, and to effect reversible automatic shifting of the valve means to the off connection when high or low torque has been selected with the switch means and the transmission sensor means senses a high transmission ratio.

12. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system interconnecting the pump and the motor to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connections between off, high torque, and low torque; pressure signal means operatively associated with the hydraulic system for sensing fluid pressure; and transmission sensor means operatively associated with the transmission for sensing the forward high, intermediate, and low transmission ratios and the reverse transmission ratios; the improvement comprising: control means operatively associated with the transmission sensor means, the pressure signal means, the valve means and the switch means to effect shifting of the valve means to the high or the low torque connections when high or low torque, respectively, has been selected with the switch means and the transmission sensor means senses a forward low or reverse transmission ratio and the pressure signal means senses a pressure of the pressurized fluid above a predetermined high pressure level, to effect reversible automatic shifting of the valve means from the high torque to the low torque connections when high torque has been selected with the switch means and either one or both of the transmission sensor means senses an intermediate transmission ratio or the pressure sensor means senses a pressure of the pressurized fluid below a predetermined high pressure level, and to effect reversible automatic shifting of the valve means to the off connection when high or low torque has been selected with the switch means and either one or both of the transmission sensor means senses a high transmission ratio or the pressure signal means senses a pressure of the pressurized fluid below a predetermined low pressure level.

13. A hydrostatic driven control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connections between off, high torque, and low torque; pressure signal means operatively associated with the hydraulic system for sensing fluid pressure; and transmission sensor means operatively associated with the transmission for sensing the forward high, intermediate, and low transmission ratios and the reverse transmission ratios; the improvement comprising: control means operatively associated with the transmission sensor means, the pressure signal means, the valve means and the switch means to effect shifting of the valve means to the high or the low torque connections when high or low torque, respectively, has been selected with the switch means and the pressure signal means senses a pressure of the pressurized fluid above a predetermined high pressure level, to effect reversible automatic shifting of the valve means from the high torque to the low torque connections when high torque has been selected with the switch means and either one or both of the transmission sensor means senses a forward intermediate transmission ratio while the pressure signal means senses a pressure of the pressurized fluid above a predetermined high pressure level or the pressure signal means senses a pressure of the pressurized fluid below the predetermined high pressure level and the transmission sensor means senses a forward low or reverse transmission ratio, and to effect reversible automatic shifting of the valve means to the off connection when high or low torque has been selected with the switch and either the transmission sensor means senses a forward high transmission ratio while the pressure signal means senses a pressure of the pressurized fluid above a predetermined high pressure level or the pressure signal means senses a pressure of the pressurized fluid below the predetermined low pressure level while the transmission sensor means senses a forward or a reverse transmission ratio.

14. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system interconnecting the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connection between off, high torque, and low torque; transmission sensor means operatively associated with the transmission for sensing the forward high, intermediate, and low transmission ratios and the reverse transmission ratios; pressure signal means operatively associated with the hydraulic system for sensing fluid pressure; the improvement comprising: control means operatively associated with the transmission sensor means, the pressure signal means, the valve means, and the switch means to shift the valve means between its forward and reverse connections in accordance with forward and reverse ratios, respectively, of the transmission when either high or low torque has been selected with the switch means, to effect reversible automatic shifting of the valve means from the high to the low torque connection when high torque has been selected with the switch means and either one or both of the transmission sensor means senses an intermediate transmission ratio or the pressure signal means senses a pressure of the pressurized fluid below a predetermined high pressure level, to effect reversible automatic shifting of the valve means to off when high or low torque has been selected with the switch means and either or both of the transmission sensor means senses a high transmission ratio or the pressure signal means senses a pressure of the pressurized fluid below a predetermined low pressure level, to effect reversible automatic shifting of the valve means from the low to the high torque connection when low torque has been selected with the switch means and the pressure signal means senses a pressure of the pressurized fluid above the predetermined low pressure level while the transmission sensor means senses a reverse transmission ratio.

15. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts connected to the additional wheels; a hydraulic system interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors; and a reverse connection wherein it connects the motors with the pump for reverse rotation of the motors; switch means for selecting the valve means connections between off, high torque, and low torque, transmission sensor means operatively associated with the transmission for sensing the forward high, intermediate, and low transmission ratios and the reverse transmission ratios; pressure signal means operatively associated with the hydraulic system for sensing fluid pressure; the improvement comprising: control means operatively associated with the transmission sensor means, the pressure signal means, the valve means, and the switch means to shift the valve means between its forward and reverse connections in accordance with forward and reverse ratios, respectively, of the transmission when high or low torque has been selected with the switch means, to effect reversible automatic shifting of the valve means from the high to the low torque connection when high torque has been selected with the switch means and either one or both of the transmission sensor means senses an intermediate transmission ratio or the pressure signal means senses a pressure of the pressurized fluid below a predetermined high pressure level while the transmission sensor means senses a forward transmission ratio, to effect reversible automatic shifting of the valve means to the off connection when high or low torque has been selected with the switch means and either one or both of the transmission sensor means senses a high transmission ratio or the pressure signal means senses a pressure of the pressurized fluid below the predetermined low pressure level while the transmission sensor means senses a forward transmission ratio, and to effect reversible automatic shifting of the valve means from the low to the high torque connection when low torque has been selected with the switch means and the pressure signal means senses a pressure of the pressurized fluid above the predetermined low pressure level while the transmission sensor means senses a reverse transmission ratio.

16. The invention defined in claim 15 wherein the pressure signal means includes time delay means delaying operation of the control means so that short interval reversible high-low-off torque cycling of the valve means is prevented.

17. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump to the motors to supply pressurized fluid from the pump to the motors; torque valve means in the hydraulic system shiftable between a high torque position wherein it connects the motors with the pump in parallel relationship with each other and a low torque position wherein it connects the motors with the pump in series relationship with each other; direction valve means in the hydraulic system shiftable between an off position wherein it disconnects the motors from the pump, a forward position wherein it connects the motors with the pump for forward rotation of the motors, and a reverse position wherein it connects the motors with the pump for reverse rotation of the motors; torque switch means for selecting between the off position of the direction valve means, and the high torque and low torque positions of the torque valve means; transmission sensor means operatively associated with the transmission for sensing the forward high, intermediate, and low transmission ratios and the reverse transmission ratios; pressure signal means operatively associated with the hydraulic system for sensing fluid pressure; the improvement comprising: torque control means operatively associated with the transmission sensor means, the torque switch means, the pressure signal means, and the torque valve means to effect reversible automatic shifting of the torque valve means from the high to the low torque connections when high torque has been selected with the torque switch means and either one or both of the transmission sensor means senses an intermediate transmission ratio or the pressure signal means senses pressure of the pressurized fluid below a predetermined high pressure level while the transmission sensor means senses a forward transmission ratio, and to effect reversible automatic shifting of the torque valve means from the low to the high torque connection when low torque has been selected with the switch means and the transmission sensor means senses a reverse transmission ratio; and direction control means operatively associated with the transmission sensor means, the torque switch means, the pressure signal means, the torque valve means and the direction valve means to shift the direction valve means between its forward and reverse positions in accordance with forward and reverse ratios, respectively, of the transmission when either high or low torque positions of the torque valve means have been selected with the switch means, to effect reversible automatic shifting of the direction valve means to the off position when the high or low torque connection of the torque valve means has been selected by the torque switch means and either one or both of the transmission sensor means senses a high transmission ratio or the pressure signal means senses a pressure of the pressurized fluid below a predetermined low pressure level.

18. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system interconnecting the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connection between off, high torque, and low torque; transmission sensor means operatively associated with the transmission for sensing the forward high, intermediate, and low transmission ratios and the reverse transmission ratios; pressure signal means operatively associated with the hydraulic system for sensing fluid pressure; the improvement comprising: control means operatively associated with the transmission sensor means, the pressure signal means, the valve means, and the switch means to shift the valve means between its forward and reverse connections in accordance with forward and reverse ratios, respectively, of the transmission when either high or low torque has been selected with the switch means, to effect reversible automatic shifting of the valve means from the high to the low torque connection when high torque has been selected with the switch means and either one or both of the transmission sensor means senses an intermediate transmission ratio or the pressure signal means senses a pressure of the pressurized fluid below a predetermined high pressure level while the transmission sensor means senses a forward transmission ratio, to effect reversible automatic shifting of the valve means to the off connection when either the transmission sensor means senses a high transmission ratio or the pressure signal means senses a pressure of the pressurized fluid below the predetermined high pressure level while the transmission sensor means senses a reverse transmission ratio or the pressure signal means senses a pressure of the pressurized fluid below a predetermined low pressure level while the transmission sensor means senses a forward transmission ratio and to effect reversible automatic shifting of the valve means to the high torque connection in response to low torque selection of the switch means and the transmission sensor means sensing of a reverse transmission ratio.

19. A hydrostatic drive control system in a vehicle having an engine; a pair of main drive wheels; a variable ratio transmission adapted to drivingly connect the engine to the drive wheels and having associated transmission controls adapted to change the transmission between forward high, intermediate, and low ratios and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and the motors to supply pressurized fluid from the pump to the motors; torque valve means in the hydraulic system shiftable between a high torque position wherein it connects the motors with the pump in parallel relationship with each other and a low torque position wherein it connects the motors with the pump in series relationship with each other; direction valve means in the hydraulic system shiftable between an off position wherein it disconnects the motors from the pump, a forward position wherein it connects the motors with the pump for forward rotation of the motors, and a reverse position wherein it connects the motors with the pump for reverse rotation of the motors; torque switch means for selecting between the off position of the direction valve means, and the high torque and low torque positions of the torque valve means; transmission sensor means operatively associated with the transmission for sensing the forward high, intermediate, and low transmission ratios and the reverse transmission ratios; pressure signal means operatively associated with the hydraulic system for sensing fluid pressure; the improvement comprising: torque control means operatively associated with the transmission sensor means, the torque switch means, the pressure signal means, and the torque valve means to effect reversible automatic shifting of the torque valve means from the high to the low torque connections when high torque has been selected with the torque switch means and either one or both of the transmission sensor means senses an intermediate transmission ratio or the pressure signal means senses a pressure of the pressurized fluid below a predetermined high pressure level while the transmission sensor means senses a forward transmission ratio, and to effect reversible automatic shifting of the torque valve means from the low torque to the high torque connection when low torque has been selected with the torque switch means and the transmission sensor means senses a reverse transmission ratio; forward and reverse direction control means operatively associated with the transmission sensor means, the torque switch means, the pressure signal means, and the direction valve means to shift the direction valve means between its forward and reverse positions in accordance with forward and reverse ratios, respectively, of the transmission when-ever either high or low torque positions of the torque valve means have been selected with the switch means, to effect reversible automatic shifting of the direction valve means to the off position when either the transmission sensor means senses a high transmission ratio or the pressure signal means senses pressure of the pressurized fluid below a predetermined low pressure level while the transmission sensor means senses a forward transmission ratio or the pressure signal means senses a pressure of the pressurized fluid below the predetermined high pressure level while the transmission sensor means senses a reverse transmission ratio.

20. The invention claimed in claim 19 wherein the pressure signal means includes time delay means delaying operation of the torque control means and the forward and reverse direction control means so that short interval high-to-low torque cycling of the torque valve means and forward-to-off and reverse-to-off cycling of the direction valve means are prevented.

21. A hydrostatic drive control system in a vehicle having an engine; a pair of main drive wheels; a variable ratio transmission adapted to drivingly connect the engine to the drive wheels; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, and a low torque connection wherein it connects the motors with the pump in series relationship with each other; switch means for selecting the valve means connections between off, high torque, and low torque; pressure signal means operatively associated with the hydraulic system for sensing fluid pressure; the improvement comprising: control means operatively associated with the valve means, the switch means. and the pressure signal means to effect reversible automatic shifting of the valve means from the high to the low torque connections when high torque has been selected with the switch means and the pressure signal means senses pressure of the pressurized fluid below a predetermined high pressure level and to effect reversible automatic shifting of the valve means to the off connection when the pressure signal means senses a pressure of the pressurized fluid below a predetermined low pressure level.

22. A hydrostatic drive control system in a vehicle having an engine; a pair of main drive wheels; a variable ratio transmission adapted to drivingly connect the engine to the drive wheels in forward and reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors and a reverse connection wherein it connects the motors with the pump for reverse rotation of the motors; switch means for selecting the valve means connections between off, high torque, and low torque; transmission sensor means operatively associated with the transmission for sensing the forward and reverse transmission ratios; pressure signal means operatively associated with the hydraulic system for sensing fluid pressure; the improvement comprising: control means operatively associated with the valve means, the switch means, the transmission sensor means, and the pressure signal means to effect reversible automatic shifting of the valve means from the high to the low torque connections when high torque has been selected with the switch means, the transmission sensor means senses a forward or reverse transmission ratio, and the pressure signal means senses a pressure of the pressurized fluid below a predetermined high pressure level and to effect reversible automatic shifting of the valve means to the off connection when high or low torque has been selected with the switch means, the transmission sensor means senses a forward or reverse transmission ratio and the pressure signal means senses a pressure of the pressurized fluid below a predetermined low pressure level.

23. A hydrostatic drive control system in a vehicle having an engine; a pair of main drive wheels; a variable ratio transmission adapted to drivingly connect the engine to the drive wheels in forward or reverse ratios; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and the motors to supply pressurized fluid from the pump to the motors; valve means in the hydraulic system shiftable between an off connection wherein it disconnects the motors from the pump, a high torque connection wherein it connects the motors with the pump in parallel relationship with each other, a low torque connection wherein it connects the motors with the pump in series relationship with each other, a forward connection wherein it connects the motors with the pump for forward rotation of the motors, and a reverse connection wherein it connects the motors with the pump for reverse rotation of the motors; switch means for selecting the valve means connections between off, high torque, and low torque; transmission sensor means operatively associated with the transmission for sensing the forward and reverse transmission ratios; pressure signal means operatively associated with the hydraulic system for sensing fluid pressure; the improvement comprising: control means operatively associated with the valve means, the switch means, the transmission sensor means, and the pressure signal means to effect reversible automatic shifting of the valve means from the high to the low torque connections when high torque has been selected with the switch means, the transmission sensor means senses a forward transmission ratio, and the pressure signal means senses a pressure of the pressurized fluid below a predetermined high pressure level and to effect reversible automatic shifting of the valve means to the off connection when high torque or low torque has been selected with the switch means and either the transmission sensor senses a forward transmission ratio and the pressure signal means senses a pressure of the pressurized fluid below a predetermined low pressure level or the transmission sensor senses a reverse transmission ratio and the pressure signal means senses a pressure of the pressurized fluid below the predetermined high pressure level.

24. A hydrostatic drive control system in a vehicle having an engine; a pair of main drive wheels; a variable ratio transmission adapted to drivingly connect the engine to the drive wheels; an axle structure having additional wheels journaled at opposite ends thereof; a hydraulic pump driven by the engine to provide pressurized fluid; a pair of hydraulic wheel motors mounted at opposite ends of the axle structure and including output shafts operatively connected to the additional wheels; a hydraulic system operatively interconnecting the pump and the motors to supply pressurized fluid from the pump to the motors; torque valve means in the hydraulic system shiftable between a high torque position wherein it connects the motors with the pump in parallel relationship with each other and a low torque position wherein it connects the motors with the pump in series relationship with each other; direction valve means in the hydraulic system shiftable between an off position wherein it disconnects the motors from the pump, a forward position wherein it connects the motors with the pump for forward rotation of the motors, and a reverse position wherein it connects the motors with the pump for reverse rotation of the motors; torque switch means for selecting the torque valve means connections between high torque and low torque; pressure signal means operatively associated with the hydraulic system for sensing fluid pressure; the improvement comprising; torque control means operatively associated with the torque switch means, the torque valve means, and the pressure signal means to effect reversible automatic shifting of the torque valve means from the high to the low torque connections when high torque has been selected with the torque switch means and the pressure signal means senses a pressure of the pressurized fluid below a predetermined high pressure level; and direction control means operatively associated with the direction valve means and the pressure signal means to effect reversible automatic shifting of the direction valve means to the off position when the pressure signal means senses a pressure of the pressurized fluid below a predetermined low pressure level.

25. The invention defined in claim 24 wherein the pressure signal means includes time delay means delaying operation of the torque control means and the forward and the reverse direction control means so that short interval high-to-low torque cycling of the torque valve means and forward-to-off and reverse-to-off cycling of the direction valve means are prevented.

* * * * *

UNITED STATES PATENT OFFICE
CERTIFICATE OF CORRECTION

Patent No. 3,894,606      Dated 15 July 1975

Inventor(s) Billie Gene Hunck et al

It is certified that error appears in the above-identified patent and that said Letters Patent are hereby corrected as shown below:

Column 18, line 1, after "pressure" (first occurence) insert --signal--.

Column 21, line 18, before "reverse" insert --a--.

Column 21, line 35, change "driven" to --drive--.

Column 22, line 21, insert --means-- after "switch".

Column 23, line 30, after "shafts" insert --operatively--.

Column 27, line 2, delete the hyphen in "when-ever".

Signed and Sealed this twenty-ninth Day of June 1976

[SEAL]

Attest:

RUTH C. MASON
*Attesting Officer*

C. MARSHALL DANN
*Commissioner of Patents and Trademarks*